June 7, 1932.   LE ROY P. BRANCH   1,861,683
KNIFE HOLDER AND SHARPENER
Filed May 25, 1928   2 Sheets-Sheet 2

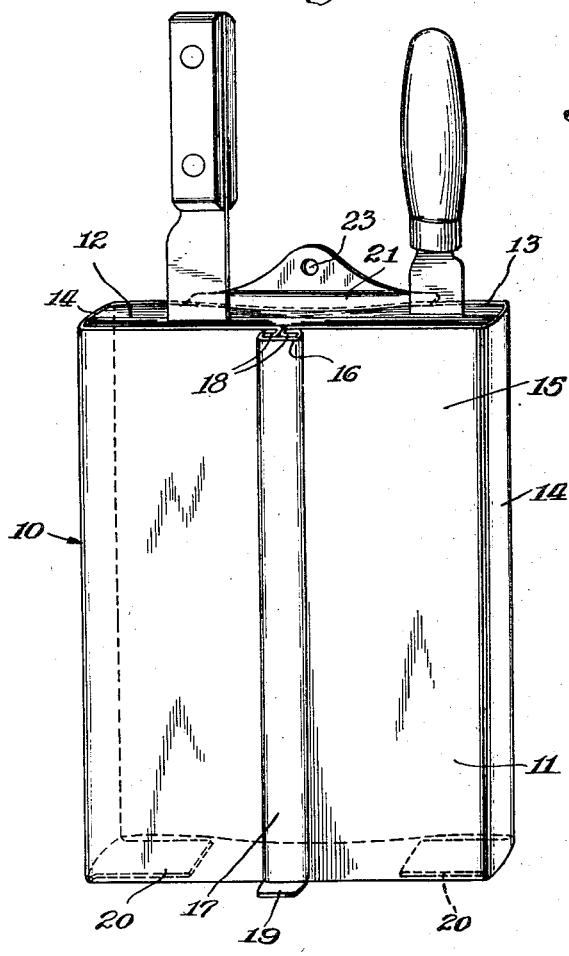
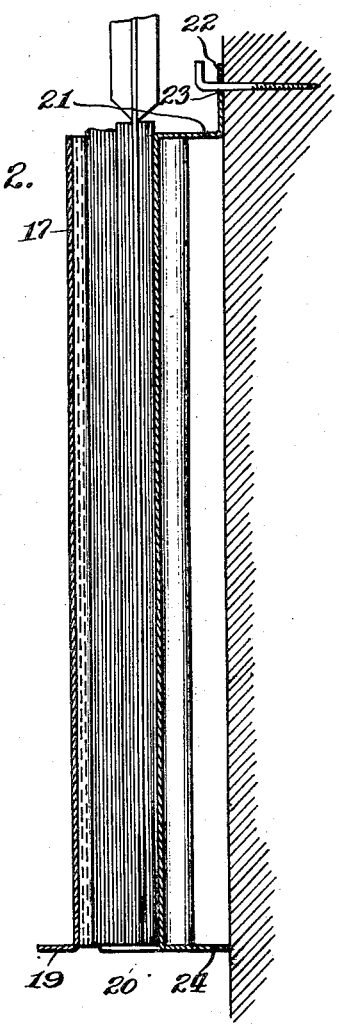
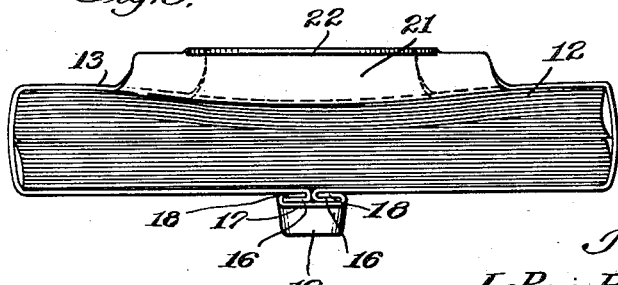

Inventor
LeRoy P. Branch
By Williams, Bradbury, McCaleb & Hinkle
Attys.

Patented June 7, 1932

1,861,683

UNITED STATES PATENT OFFICE

LE ROY P. BRANCH, OF EVANSTON, ILLINOIS, ASSIGNOR OF ONE-HALF TO ALBERT G. McCALEB, OF EVANSTON, ILLINOIS

KNIFE HOLDER AND SHARPENER

Application filed May 25, 1928. Serial No. 280,524.

My invention contemplates the provision of a kitchen accessory which may be hung on a wall or be kept in a table drawer or other convenient place, and which will receive and hold knives in such a way as to protect the sharpened edges thereof. In the ordinary kitchen, sharpened knives quickly have their edges dulled by being jarred into contact with cutlery or other objects kept in a table drawer or like receptacle.

One of the objects of my invention is to provide a device which will hold a plurality of knives in such a way that no one of the knives will have its sharpened edge dulled by contact with extraneous objects or any other knife disposed in the holder.

Another object is to provide a knife holder which on the insertion of a knife therein, will remove by absorption all moisture from the blade of the knife.

A further object of the invention is to provide a simple and effective means, which conveniently may form part of the holding device, for sharpening knives.

Other objects, features and advantages of my invention will appear from the following description, wherein reference is made to the accompanying drawings, in which Figure 1 is a view in perspective of a device embodying the improvements of the present invention, this view illustrating two knives disposed in the holder;

Figure 2 is a central, vertical, sectional view, on enlarged scale, showing the holder hung on a wall;

Figure 3 is a top plan view of the holder;

Similar characters of reference refer to similar parts throughout the several views.

Figure 4:
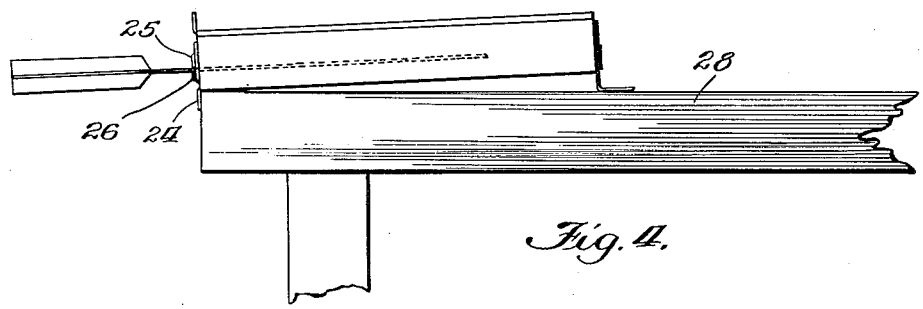
Figure 4 is an elevational view illustrating how the device of the present invention may be disposed upon a table top and against the edge thereof when the said device is used as a knife sharpener.

Referring to Figures 1 to 3, 10 indicates in its entirety, the device of my invention, which comprises a container 11 for a group or groups of sheets 12 which are preferably of soft unglazed and absorbent paper, such as is found in low priced magazines. The container 11 preferably consists of an open ended receptacle constructed of light sheet metal, which has an inwardly curved rear wall 13, side walls 14 and a front wall 15. This container may be constructed of a single sheet of metal bent to substantially box-like form and having its opposed vertical edges provided with flanges 16 adapted to be engaged by a clip 17. The clip 17 consists of a metal channel having its legs turned toward each other to form flanges 18. The clip is preferably provided at one end with a lug 19 for use in sliding the clip off from the front wall flanges 16. The container is also provided with a pair of lugs 20 which extend inwardly at each side of the container along the base, and which are adapted to retain the sheets 12 in the container without entirely closing its base.

At its upper end the container is provided with a backwardly extending transverse flange 21, which is bent upwardly as at 22 and provided with an aperture 23 to be used in supporting the container upon a wall hook or the like. The container is also provided at its bottom with a rearwardly extending transverse flange 24 which is preferably of the same width as the flange 21, so that the container will be supported substantially parallel to the wall. The flanges 21 and 24 permit the insertion of knives into the holder, although the knife handles may be quite thick, without interference with the wall.

The container 11 is preferably of such size and shape that it will receive one or two standard size paper backed magazines. Old magazines constitute an excellent filler for the container but, of course, I do not limit myself to this specific kind of filler. The inwardly curved back of the container insures that the paper sheets will at all times be closely but yieldingly confined under a pressure exerted at right angles to a knife blade inserted between the sheets. It also should be noted (Figure 3) that the paper chamber afforded by the container is wider at its vertical sides than at its intermediate portion, in order to accommodate the bindings of magazines when the same are used as a filler—the use of magazines being illustrated in the drawings.

A knife blade inserted at the open upper end of the container will find its way down between two of the filler sheets and be there held in the vertical position, due to the compression under which the sheets are held, with the edge of the blade adequately protected. Moreover, if the filler sheets are of soft unglazed paper, as is desirable, any moisture on the blade will be absorbed and dimming or dulling of the blade by oxidization due to excess moisture will be prevented or substantially eliminated.

I prefer to combine with the structure just described, additional elements for enabling my device to be used as a knife sharpener. In Figures 4 to 8, I have illustrated the construction and use of the knife sharpener. For this purpose the sheets 12 may have associated with them, sheets of abrasive material 25 and 26, only one of these abrasive sheets, however, being arranged with its abrasive surface outward.

Figure 5:
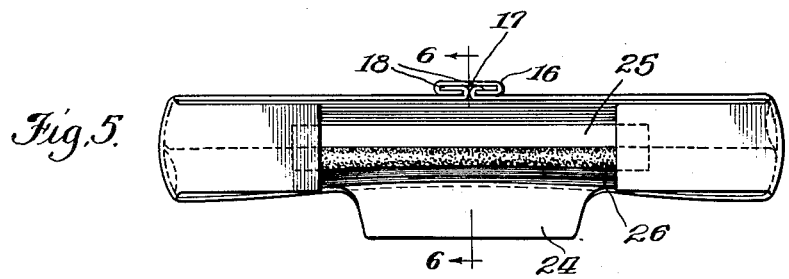
Figure 5 is a bottom plan view of the device of the present invention.
Figure 6:
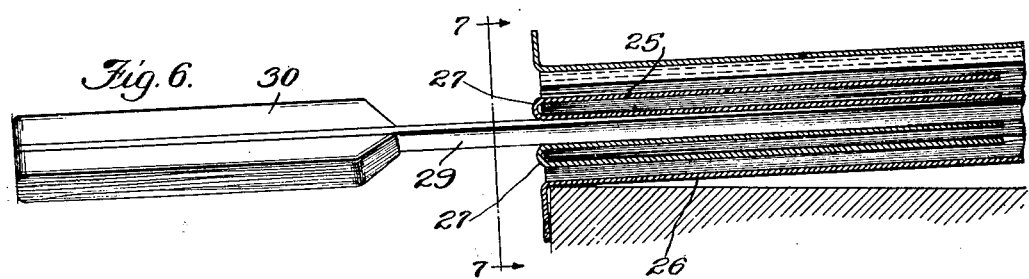
Figure 6 is an enlarged fragmentary sectional view, which may be regarded as being taken on the line 6—6 of Figure 5, illustrating how the device of the present invention may be used as a knife sharpener.
Figure 8:
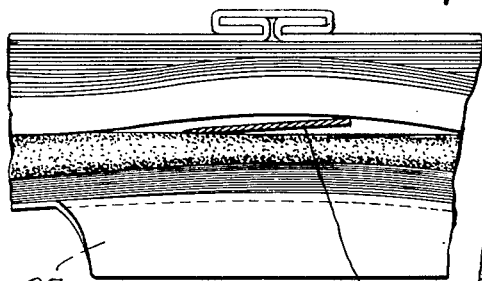
Figure 8 is a view corresponding to Figure 7, but illustrating how a knife blade to be sharpened appears immediately after insertion into the device, but before being tilted to the position illustrated in Figures 6 and 7.
Figure 7:
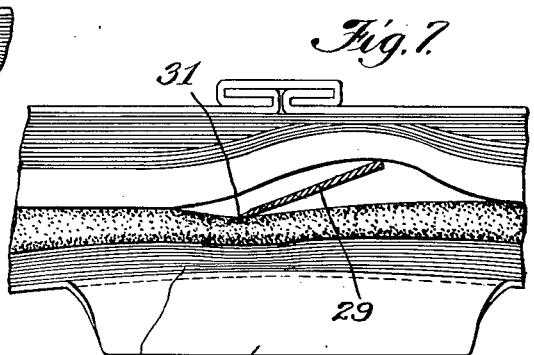
Figure 7 is an enlarged fragmentary end view, which may be regarded as taken on the line 7—7 of Figure 6.

The abrasive sheets, which are preferably of emery cloth, are folded upon themselves and placed between the non-abrasive sheets 12, as shown in Figure 6, leaving slightly rounded portions 27 of the abrasive sheets exposed at the bottom of the container. Referring to Figure 5, it will be observed that the abrasive sheet 25 is folded with its non-abrasive surface outward, while the abrasive sheet 26 has a portion of its abrasive surface opposed to the back or non-abrasive surface of the sheet 25.

When the effective half of the abrading surface of the sheet 26 (i. e. the half of the abrading surface which lies adjacent the sheet 25) has been worn out, the sheet 26 may be withdrawn and replaced with the unworn half of its abrading surface lying adjacent the sheet 25. After both halves of the abrading surface of sheet 26 are worn out, the relation of sheets 25 and 26 may be reversed, that is to say, sheet 25 may be disposed with its abrading surface outwardly presented, and sheet 26 disposed with its worn abrading surface inwardly presented.

The use of the device of my invention as a knife sharpener is illustrated in Figures 4, 6, 7 and 8. The container is placed upon a table 28 with the flange 24 in engagement with the edge of the table. This enables the operator to retain the container firmly upon the table 28 with one hand, while the knife blade 29 is inserted with the other hand to the position shown in Figure 8. As the container 11 yieldingly clamps the sheets 12, 25 and 26, the blade will be somewhat firmly clamped between the abrading surface 26 and non-abrading surface 25. Now, by means of its handle 30, the blade is axially rotated to the position shown in Figures 6 and 7, so that the edge 31 of the blade will be brought into contact with the abrading surface 26 at the requisite angle.

The blade is then reciprocated within the container, during which operation the container, by its pressure on the several sheets, will keep the blade edge in firm but yielding engagement with the abrading surface, and will enable the operator to maintain the blade at a substantially constant angle to the abrading surface, thereby facilitating a uniform sharpening. After a sufficient number of reciprocations, the blade is withdrawn and re-inserted in reverse relation to the abrading sheet, to permit the abrasive material to act upon the other side of the blade edge.

While I have illustrated and described a specific embodiment of my invention, I appreciate that many modifications may be made without departing from the gist and spirit of my invention. Therefore, I do not wish to be limited to the details herein shown and described, but desire to avail myself of all changes within the scope of the appended claims.

Having thus described my invention, what I claim as new and desire to secure by Letters Patent of the United States is:

1. In a knife holder, the combination of a metal container of substantially rectangular cross-section having open ends and a pair of flanges extending into one end, with a plurality of sheets of non-abrading material resting on said flanges, one of the walls of said container being bowed inwardly to resiliently engage said sheets, said container having a slit and means for releasably securing said container about said sheets.

2. In a knife holder, the combination of a metal container of substantially rectangular cross-section having open ends and a pair of flanges extending into one end, with a plurality of sheets of non-abrading material resting on said flanges, one of the walls of said container being bowed inwardly to resiliently engage said sheets, said container having a slit, and means for releasably securing said container about said sheets, comprising oppositely turned flanges on said container and an interlocking member adapted to slidably engage said flanges.

3. A knife holder comprising a multiplicity of paper sheets lying against each other and adapted to receive the blade of a knife or the like between said sheets, and resilient means for supporting said sheets and resiliently urging said sheets together to grip a knife blade, said sheets being secured together in book form for quick removal and replacement.

4. A knife holder comprising a multiplicity of paper sheets lying against each other and adapted to receive the blade of a knife or the like between said sheets, and resilient means for supporting said sheets and resiliently urging said sheets together to grip a knife blade, said sheets comprising unglazed absorbent paper for wiping and absorption of foreign matter from the blade.

5. A knife holder comprising a multiplicity of paper sheets lying against each other and adapted to receive the blade of a knife or the like between said sheets, resilient means for supporting said sheets and resiliently urging said sheets together to grip a knife blade, said means comprising a sheet metal casing for said sheets, and quickly detachable means for securing the walls of said casing together.

6. A knife holder comprising a multiplicity of paper sheets lying against each other and adapted to receive the blade of a knife or the like between said sheets, resilient means for supporting said sheets and resiliently urging said sheets together to grip a knife blade, said means comprising a sheet metal casing for said sheets, and quickly detachable means for securing the walls of said casing together, comprising a slider adapted to engage oppositely extending flanges on the adjacent parts of the casing wall.

In witness whereof I hereunto subscribe my name this 15th day of May, 1928.

LE ROY P. BRANCH.